May 29, 1934.  J. G. VINCENT  1,960,357
TRANSMISSION
Filed Sept. 4, 1929
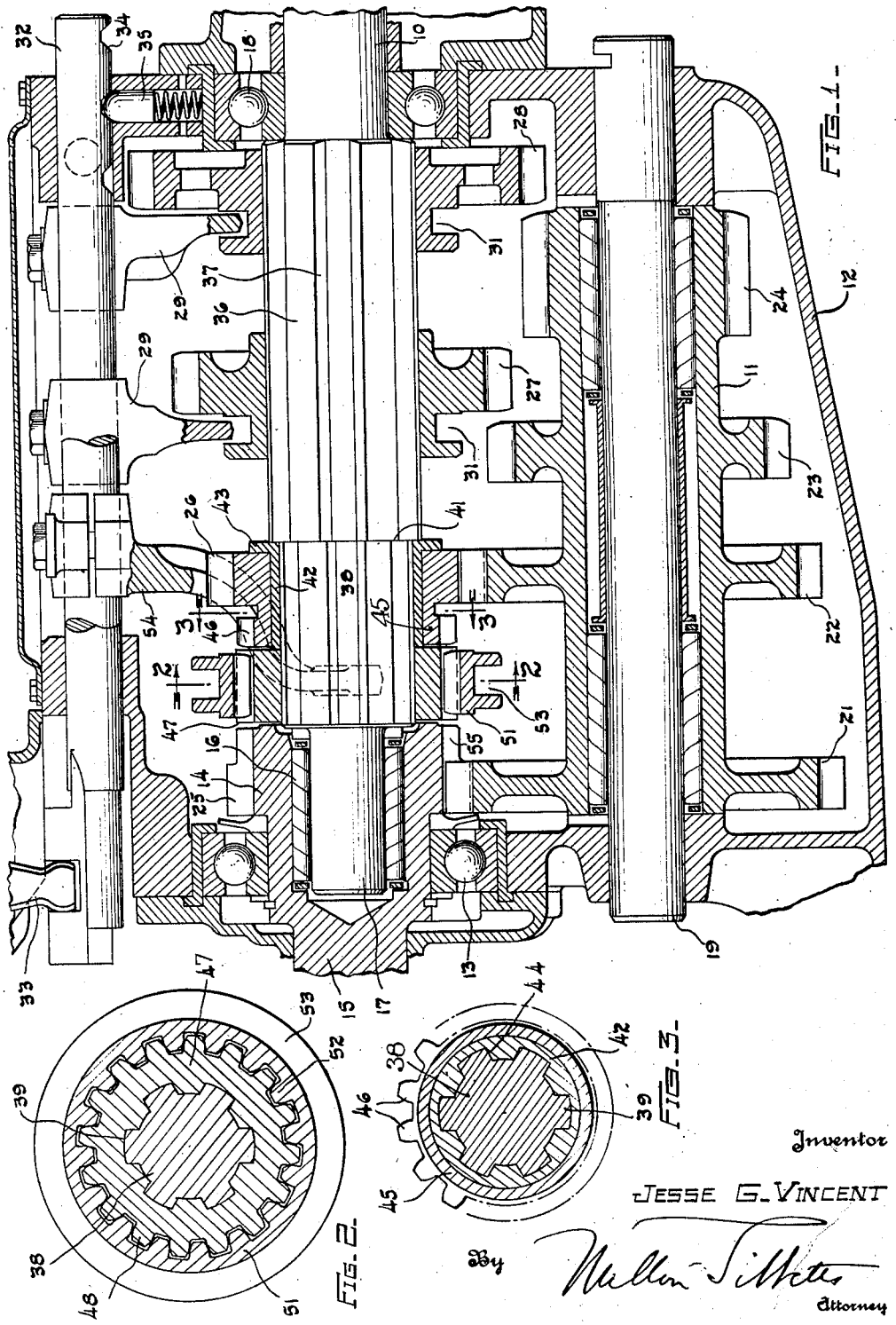
Inventor
JESSE G. VINCENT
By
Attorney Patented May 29, 1934

1,960,357

UNITED STATES PATENT OFFICE 1,960,357

TRANSMISSION

Jesse G. Vincent, Detroit, Mich., assignor to Packard Motor Car Company, Detroit, Mich., a corporation of Michigan Application September 4, 1929, Serial No. 390,395

12 Claims. (Cl. 74—57)

This invention relates to transmissions and particularly to the transmission mechanism of motor vehicles, and it has for one of its objects to provide an improved mounting for some of the gear elements of such transmissions.

Another object of the invention is to provide a transmission having a splined shaft with means for rotatably mounting a gear on said shaft.

Another object of the invention is to provide a transmission with a gear carrying shaft having splined portions of different diameters, which may be easily and accurately machined and on which the gear supporting means may be accurately formed and positioned.

A further object of the invention is to provide a transmission shaft assembly which shall be accurate and inexpensive.

Other objects of the invention will appear from the following description taken in connection with the drawing, which forms a part of this specification, and in which:

Fig. 1 is a longitudinal, vertical section through a motor vehicle transmission constructed in accordance with this invention, and Figs. 2 and 3 are sections taken substantially on the lines 2—2 and 3—3 of Fig. 1 respectively.

Although not limited in this respect the invention is described in connection with selective transmissions of the type in which two or more of the speeds are obtained through suitable gear trains which are constantly in mesh and which may be connected to the driven shaft by suitable clutch means.

Referring to the drawing, in Fig. 1 is shown a motor vehicle transmission comprising a transmission shaft 10 and a countershaft or gear spool 11, mounted in a housing or transmission case 12. The front wall of the housing 12 carries a suitable bearing 13 in which is mounted the enlarged rear end 14 of a driving shaft 15, which may be the vehicle clutch shaft, driven from the vehicle engine through conventional clutch mechanism (not shown). The enlarged end 14 of the clutch shaft is formed with an axial recess for the reception of a bearing 16, in which the reduced forward end 17 of the transmission shaft 10 is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19 supported at its ends by the transmission case walls, and this spool is formed with a number of integral gears 21, 22, 23, and 24. Of these, the gear 21 is in constant mesh with a gear or pinion 25, formed on the enlarged end 14 of the shaft 15, so that the countershaft 11 is continuously connected to and driven from this clutch shaft 15 in the well known manner. The gear 22 is also continuously in mesh with a gear 26 which is mounted for rotation on the shaft 10 in a manner to be presently described.

Gears 23 and 24 are of different sizes and are adapted to be engaged by gears 27 and 28 respectively, these last mentioned gears being splined to and slidable on the shaft 10 to provide other speed ratios for the transmission, in the well known manner. Such sliding action is effected in the usual way by means of shifter forks 29, which engage in grooves 31 in the bodies of the gears, each fork being actuated by a shifter rod 32 slidably mounted in suitable bearings in the upper part or cover portion of the casing 12. The shifter rods 32 are selectively actuated by a lever 33 which may be manually operated by the vehicle driver, and they are adapted to be latched in position, either in neutral or in gear engaging position, by suitable notches 34 engaged by spring-pressed latches 35 mounted in the wall of the casing. Thus, in the illustrated embodiment of the invention, gear 28 may be moved to mesh with gear 24, to provide a first speed, and gear 27 may be meshed with gear 23 to provide a second speed. Third speed is provided by connecting the constant mesh gear 26 to the shaft 10, and fourth or high speed is secured by connecting the shafts 10 and 15, thus providing a direct drive.

In accordance with this invention the shaft 10 is provided with gear supporting portions of different diameters. The rear end of the shaft has a portion 36 provided with splines 37 on which the gears 27 and 28 are mounted by means of the usual splined hubs, so that these gears turn with the shaft but are axially slidable thereon as previously described. Shaft 10 also has a forward portion 38 of somewhat lesser diameter, provided with splines 39, the junction of the portions 36 and 38 defining a shoulder 41 which forms a positioning means for the bearing member of the constant mesh gear 26.

This bearing member consists of a sleeve or bushing 42, having a flange 43 at the rear end thereof, and splined as shown at 44 to engage the shaft splines 39. These splines are made a tight fit on the splines 39, so that the bushing must be pressed or driven into place abutting the shoulder 41. The outer surface of the bushing 42 forms a bearing on which the gear 26 is journaled, and this bearing surface is preferably formed by grinding after the bushing has been pressed into place, thus insuring that the bearing for the gear 26 is truly coaxial with the shafts 10 and 15. In this way much of the noise attendant upon the operation of constant mesh gearing is eliminated.

The body of the gear 26 is provided with an axial extension 45 on which clutch teeth 46 are formed, by means of which the gear 26 may be connected to the shaft section 38. To this end a clutch device is secured to the shaft between the gear 26 and the forward end of the portion 38. This comprises a splined clutch hub 47 which is tightly pressed on the shaft splines 39 and which has its inner end in contact with the end of the bushing 42. This hub member 47 is also provided with external splines or teeth 48 of the same size and pitch as the teeth 46 on the gear extension 45, and it is surrounded by an axially slidable clutch ring 51 having internal teeth or splines 52 which may be moved rearwardly of the transmission to engage the teeth 46. To effect such sliding movement the clutch ring is provided with a shifter groove 53, actuated by a shifter fork 54, which is connected to one of the previously described shifter rods 32. The clutch teeth 52 may also be shifted in the opposite direction to engage clutch teeth 55, formed on an axial extension of the constant mesh pinion 25. It will be evident that when the clutch ring is in engagement with the teeth 46, the constant mesh gear 26 is locked to the shaft 10, providing the third speed, and that when the teeth 55 are so engaged the shafts 10 and 15 are directly coupled, giving the fourth speed which is direct drive.

The bushing 42 is preferably slightly longer than the width of the gear 26 including its clutch tooth extension, so that this gear 26 is positioned axially between the flange 43 and the end of the clutch hub 47. This clutch hub is also preferably formed so that it does not quite extend to the forward end of the splines 39, thus providing a slight clearance between this hub and the enlarged end of the shaft 15. Thus although these members frequently rotate at very different speeds, there is no interference or wear between them.

In the manufacture of the transmission shaft assembly, the shaft blank or forging is first turned to form the portions 36 and 38, after which the splines 37 and 39 are cut, it being possible to form the splines 37 with a milling cutter because of the larger diameter of the shaft portion 36. After the shaft splines are cut and ground, the splined blank for the sleeve or bushing 42 is pressed on into position, until its flanged end 43 contacts with the shoulder 41. It is then ground to size in position, the shaft being supported during such grinding between the same centers that were used for the original turning of the shaft. In this way the bearing surface for the gear 26 is very accurately co-axial with the shaft 10. The gear 26 is then placed in position on the bearing 42, and the clutch hub 47 is pressed in position on the splines 39, thus retaining the gear 26 in position with the assembly.

It will be evident that this invention provides a multi-speed selective transmission which is particularly adaptable to the use of constant mesh gearing, which provides a convenient transmission shaft assembly, and which may be manufactured with a high degree of accuracy and at a relatively low cost.

While a specific embodiment of the invention has been described herein, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. In a motor vehicle transmission, a shaft having portions of different diameters defining a shoulder, a bearing member pressed on said smaller portion into position against said shoulder and having a bearing surface coaxial with said shaft, a hub pressed on said smaller portion adjacent and contacting said bearing member, a gear journaled on said bearing surface, and a clutch device non-rotatably mounted on said hub adapted to engage the gear.

2. In a motor vehicle transmission, a splined transmission shaft having a shoulder, a bushing having a pressed fit on said shaft forming a bearing coaxial with said shaft, said bushing having a flanged end abutting the shoulder, a gear journaled on said bearing, said gear being of less length than the bearing, and a clutch member carried on said shaft adjacent the bushing and slidable to engage said gear, said clutch member including a hub portion abutting an end of the bearing.

3. In a transmission mechanism, a splined shaft having a reduced portion forming a shoulder, a bushing tightly engaging said reduced portion and abutting the shoulder, a gear journaled on said bushing, and clutch means having a hub tightly engaging the reduced portion adjacent the bushing and a slidable portion to engage said gear.

4. In a motor vehicle transmission, a shaft having adjacent portions of different diameters, gears having a splined connection to the larger of said portions and slidable thereon, a gear rotatably mounted on the smaller portion and axially fixed thereon, and clutch means on the last named portion for selectively engaging said last named gear.

5. In a motor vehicle transmission, a shaft having adjacent splined portions of different diameters, a countershaft having gears, gears mounted on the splines of said larger shaft portion and slidable to engage some of said countershaft gears, a gear rotatably mounted on said smaller portion to constantly mesh with another of said countershaft gears, and a bearing for one of said constant mesh gears comprising a splined sleeve immovably mounted on the splines of said smaller shaft portion.

6. In a motor vehicle transmission, a shaft having adjacent splined portions of different diameters, a countershaft having gears, splined gears on the splines of said larger shaft portion and slidable to engage some of said countershaft gears, gears rotatably mounted on said smaller portion to constantly mesh with other of said countershaft gears, a bearing for one of said constant mesh gears comprising a splined sleeve immovably mounted on the splines of said smaller shaft portion, and slidable clutch means carried by said smaller portion adapted to selectively connect said rotatably mounted gears to the shaft.

7. In a motor vehicle transmission having a driven shaft of different diameters defining a shoulder, a gear provided with external splines revolvably mounted on the smaller portion of the shaft adjacent the shoulder, a clutch hub fastened to the smaller portion of the shaft and a clutch ring shiftably mounted on the clutch hub to selectively engage the external splines of the gear.

8. In a motor vehicle transmission having a drive shaft, a splined driven shaft and a countershaft, a gear and splines on the drive shaft, a gear spool on the countershaft, one of the gears thereof adapted to constantly engage the drive shaft gear, a gear rotatably mounted on the driven shaft, having splines thereon, adapted to constantly engage a gear on the gear spool adjacent the gear which engages the drive shaft gear, a clutch hub fastened to the splined driven shaft between the end of the drive shaft and the gear rotatably mounted on the driven shaft and a clutch ring splined on the hub to selectively engage either the splines of the gear rotatably mounted on the driven shaft or the splines of the drive shaft.

9. In a motor vehicle transmission, a shaft having portions of different diameters defining a shoulder, a geared member on said smaller portion located against said shoulder and having a bearing surface coaxial with said shaft, a hub pressed on said smaller member adjacent and contacting said geared member, and a clutch device non-rotatably mounted on said hub adapted to engage the gear member.

10. In a transmission mechanism, a gear train including a drive shaft, driving and driven gears, a driven shaft having adjacent splined portions of different diameters, a slidable gear mounted on the larger portion of the driven shaft, a driven gear mounted on the smaller portion of the driven shaft, a clutch having a hub disposed between the drive shaft and the driven gear secured to said driven shaft and having toothed portions adapted to engage said driven gear, and a bearing for said driven gear comprising a splined bushing immovably mounted on the splines of the smaller portion of the shaft.

11. In a motor vehicle transmission, a shaft having portions of different diameters defining a shoulder, the smaller portion of said shaft being formed with splines thereon, a bearing member splined and press-fitted on said smaller portion into position with an end abutting said shoulder and having a bearing surface co-axial with said shaft, a hub pressed on said smaller portion adjacent and with an end abutting said bearing member, a gear journaled on and between the ends of said bearing surface, and a clutch device nonrotatably mounted on said hub adapted to engage the gear member.

12. In a transmission, a shaft having an abutment, and a cylindrical bearing portion, a gear rotatably mounted on said bearing portion and retained against movement in one direction by said abutment, keyways on said shaft opening away from said abutment, a sleeve retained on said keyways and serving to limit motion of said gear away from said abutment, and a clutch mounted on said sleeve and adapted to couple said gear with said shaft.

JESSE G. VINCENT.